T. Daniels.

Soda Water App's.

No. 3,351. Reissued Mar. 30, 1869.

Witnesses;
Chas. Daniels
S. B. Porter

Inventor;
Thomas Daniels

UNITED STATES PATENT OFFICE.

THOMAS DANIELS, OF TOLEDO, OHIO.

IMPROVED SODA-WATER APPARATUS.

Specification forming part of Letters Patent No. 22,549, dated January 11, 1859; Reissue No. 3,351, dated March 30, 1869.

*To all whom it may concern:*

Be it known that I, THOMAS DANIELS, of Toledo, in the county of Lucas and State of Ohio, have invented a new and Improved Apparatus for Cooling Soda-Water and Soda-Water Sirups; and I do hereby declare that the following is a full and exact description thereof, reference being made to the accompanying drawings, and to the letters of reference marked thereon.

My invention consists in an improved apparatus for cooling and clearing soda-water and soda-water sirups.

Figure 1:
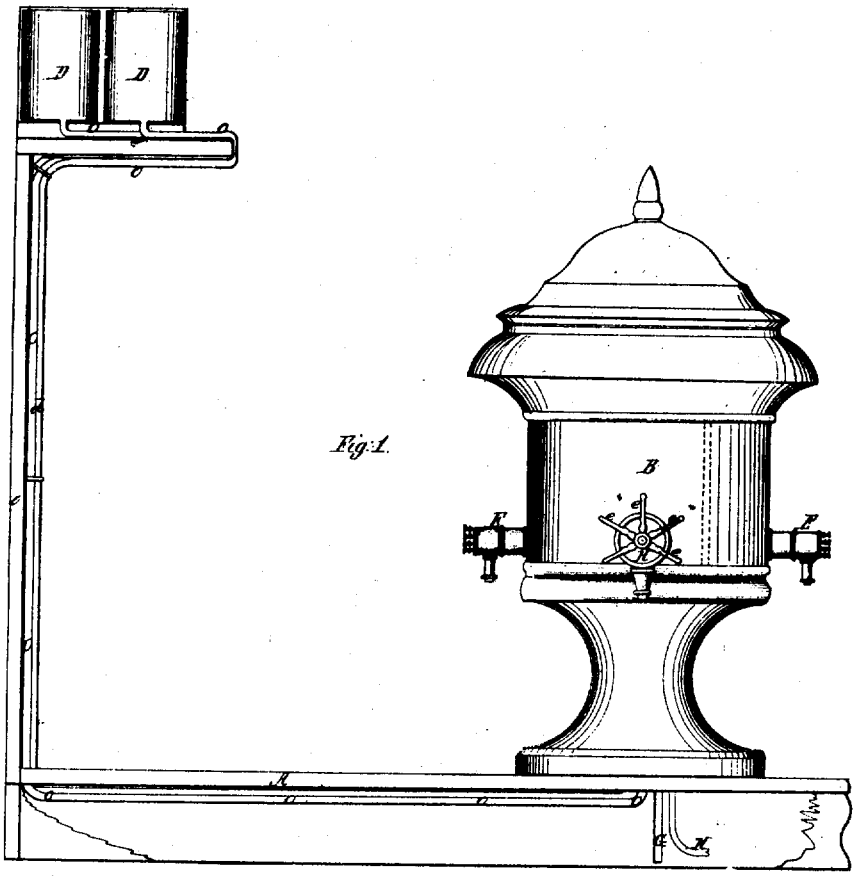
Figure 2:
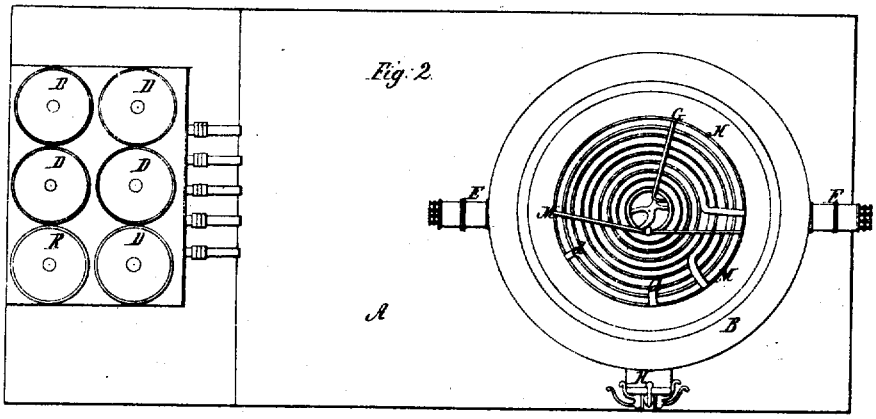

In the accompanying drawings, Figure 1 is a side view of a soda-stand with my improvement contained in it. Fig. 2 is a top view of the same with the cover of the refrigerator or ice chamber removed so as to exhibit my improvement.

After passing from the sirup-cans and the soda or carbonic-acid water reservoir up through the counter the sirup-pipes and soda or carbonic-acid water pipe enter the neck or lower part of the base or soda-stand, at which point they should be protected from the heat by a packing of cotton or other non-conductor of heat. These pipes then pass up the base, as shown by G and *d* in Fig. 1, without being brought in contact with the ice-chamber until they reach its top, over or through which they pass into the chamber itself, and are then extended down the side to the bottom or floor of the ice-chamber, where they are coiled upon that as many times as the size of the ice-chamber and the number of pipes will permit. From these coils the pipes are then extended or prolonged to the faucet or faucets through which their contents are to be discharged for use.

The manner in which the pipes pass into and are coiled upon the bottom of the ice-chamber is shown by letters M M in Fig. 2 of the drawings.

The specific gravity of the contents of the pipes is increased by cooling, and by conveying such contents over or through the top of the ice-chamber they are by that means prevented from passing back into the sirup-cans and the carbonic-acid or soda-water reservoir after they have been cooled, and are retained in the ice-chamber until required to be drawn off for use.

The sirups may be forced through the sirup-pipes either by hydraulic pressure in the manner exhibited by the elevation of the sirup-cans D D and the sirup-pipes O in the accompanying drawings, or by atmospheric pressure, the usual mode used for forcing the sirups and soda-water through the pipes, my invention being as well adapted to one as the other of these modes.

For the purpose of cooling the sirups and carbonic-acid or soda water after they are forced into the coils of pipes on the bottom of the ice-chamber, the ice is laid in the ice-chamber upon the coils of the pipes, so that it will constantly press down upon them, rendering their contents as cold as it is practicable to make them until the ice becomes melted. By keeping the ice chamber well supplied with ice in the manner described the liquids flowing through the pipes will be thus cooled as rapidly as they may be required for use, rendering the soda-water and sirups drawn through them at all times as cold and refreshing as possible with the least practicable consumption of ice.

After becoming cooled in the manner described the coldest portions of the liquids flow constantly toward the faucets where they are to be discharged and are the first to be drawn off for use.

The sirups and soda-water may be drawn off for use either by means of the compound faucet exhibited upon the vase or soda-stand shown upon Fig. 1 of the drawings, or by any of the ordinary faucets used for drawing soda-water.

To prevent the water from accumulating in the ice-chamber as the ice melts a waste-pipe should extend from the bottom of the ice-chamber down through the vase and the counter, to carry it off, as shown by the letter H in Fig. 1.

What I claim as my invention and improvement, and desire to secure by Letters Patent, is—

The extension of the sirup and soda or carbonic-acid water pipes through or over the upper part of the refrigerator or ice-chamber into the ice-chamber, and the extension of these pipes to and the coiling them upon the bottom of the ice-chamber, as described, where they can be conveniently covered with ice, and by that means and in that manner cooling their contents as they pass through such pipes to the place where they are to be discharged for use, and in that way cooling them so near the place or faucet through which they are to be finally discharged for use as to discharge such contents as nearly as possible as cold as when they leave the ice-chamber.

THOMAS DANIELS.

Witnesses:
J. M. GLOYD,
C. C. WAITE.